United States Patent [19]

Dunne

[11] Patent Number: 5,142,864
[45] Date of Patent: Sep. 1, 1992

[54] PROCESS FOR TREATING AN ENGINE EXHAUST STREAM EMPLOYING A CATALYST, AN ADSORBENT BED AND A TURBOCHARGER

[75] Inventor: Stephen Dunne, Bethel, Conn.

[73] Assignee: UOP, Des Plaines, Ill.

[21] Appl. No.: 767,590

[22] Filed: Sep. 30, 1991

[51] Int. Cl.$^5$ ................................................ F01N 3/28
[52] U.S. Cl. ........................................ 60/274; 60/280;
60/297; 422/169; 423/213.7
[58] Field of Search ................. 60/274, 280, 284, 297;
422/169; 423/212, 213.7

[56] References Cited

U.S. PATENT DOCUMENTS

| 2,942,932 | 6/1960 | Elliott . | |
|---|---|---|---|
| 3,674,441 | 7/1972 | Cole | 60/297 |
| 3,699,683 | 10/1972 | Tourtellotte et al. | 60/274 |
| 3,767,453 | 10/1973 | Hoekstra | 117/46 |
| 3,785,998 | 1/1974 | Hoekstra . | |
| 3,920,583 | 11/1975 | Pugh . | |
| 4,122,673 | 10/1978 | Leins | 60/280 |
| 4,217,757 | 8/1980 | Crone | 60/297 |
| 4,528,279 | 7/1985 | Suzuki et al. | 502/200 |
| 4,760,044 | 6/1988 | Joy et al. | 502/303 |
| 4,791,091 | 12/1988 | Bricker et al. | 502/303 |
| 4,868,148 | 9/1989 | Henk et al. | 502/303 |
| 4,868,149 | 9/1989 | Bricker | 502/303 |
| 4,934,142 | 6/1990 | Hayashi | 60/297 |
| 4,985,210 | 1/1991 | Minami | 422/169 |
| 5,051,244 | 9/1991 | Dunne | 423/212 |

FOREIGN PATENT DOCUMENTS 1205980 6/1986 Canada .................... 60/297

OTHER PUBLICATIONS

"Multicomponent Adsorption Equilibria on Molecular Sieves", C. M. Yon and P. H. Turnock, Aiche Symposium Series, No. 117, vol. 67, (1971).

*Primary Examiner*—Douglas Hart
*Attorney, Agent, or Firm*—Thomas K. McBride; Eugene I. Snyder; Frank S. Molinaro

[57] ABSTRACT

This invention relates to a process for minimizing hydrocarbon emissions from the exhaust streams of engines when the engines are first started, i.e., cold start. The process involves sequentially flowing the engine exhaust stream, which typically contains hydrocarbons, carbon monoxide and nitrogen oxide pollutants over a catalyst, the turbine side of a turbocharger and an adsorbent bed before discharging it into the atmosphere. The initial low temperature of the exhaust stream necessitates the use of the adsorbent bed. When the adsorbent bed (containing one or more molecular sieve beds) warms up (about 150° C. to about 200° C.), the majority of the exhaust stream is diverted around the adsorbent bed, while a minor portion is used to desorb the hydrocarbons adsorbed on the adsorbent bed and flowing these hydrocarbons through the compressor side of the turbocharger and then into the engine exhaust stream in front of the catalyst. When all the hydrocarbons are desorbed, the adsorbent bed is completely bypassed. The turbocharger lowers the temperature of the exhaust stream allowing hydrocarbons to be adsorbed for a longer period of time. The molecular sieves used in the invention are those that: 1) have a framework Si:Al ratio of at least 2.4; 2) are hydrothermally stable and 3) have a hydrocarbon selectivity greater than 1.

15 Claims, 1 Drawing Sheet

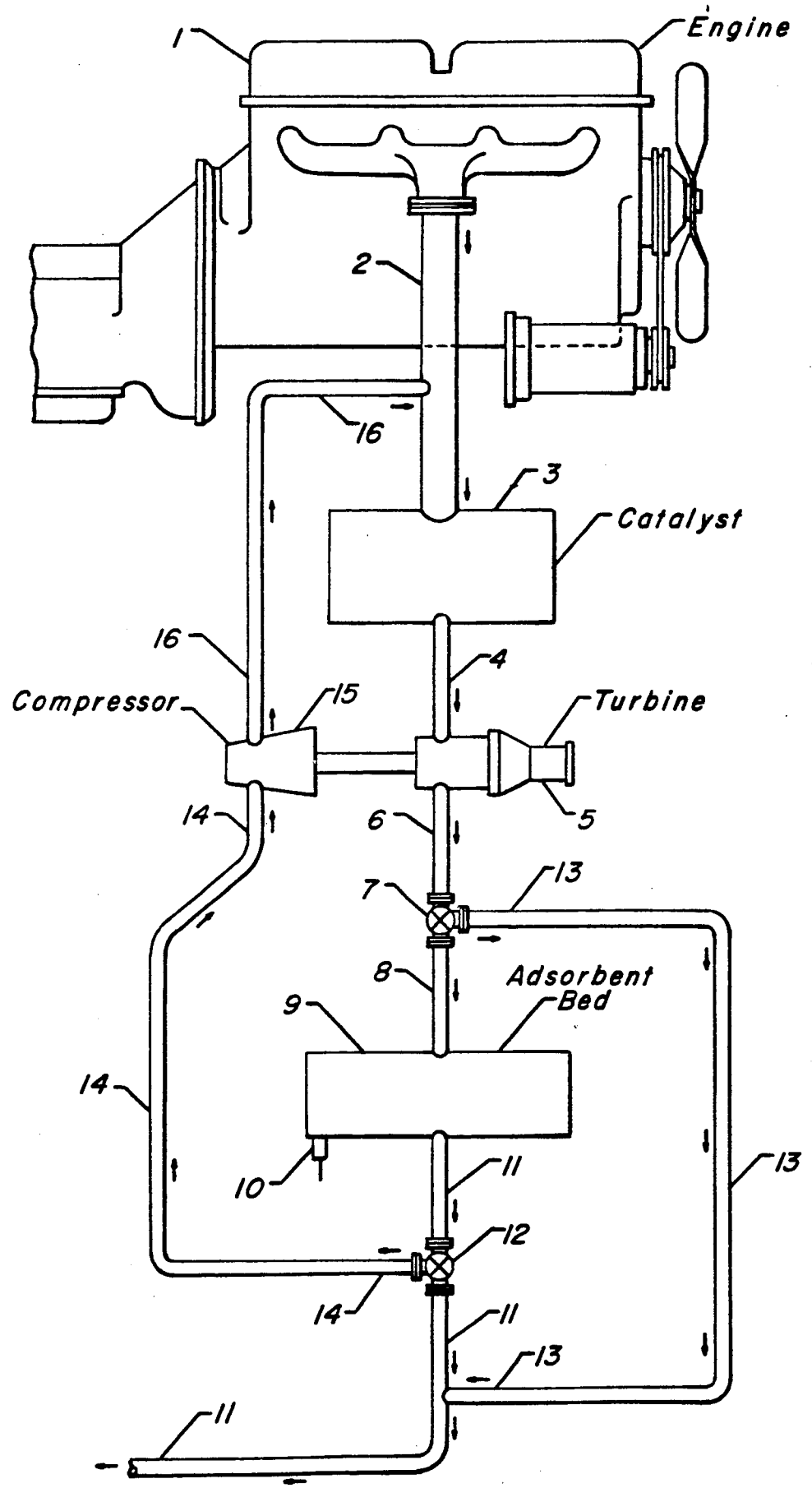

PROCESS FOR TREATING AN ENGINE EXHAUST STREAM EMPLOYING A CATALYST, AN ADSORBENT BED AND A TURBOCHARGER

BACKGROUND OF THE INVENTION

Gaseous waste products resulting from the combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. While exhaust gases from other carbonaceous fuel-burning sources, such as stationary engines, industrial furnaces, etc., contribute substantially to air pollution, the exhaust gases from automotive engines are a principal source of pollution. Because of these health problem concerns, the Environmental Protection Agency (EPA) has promulgated strict controls on the amounts of carbon monoxide, hydrocarbons and nitrogen oxides which automobiles can emit. The implementation of these controls has resulted in the use of catalytic converters to reduce the amount of pollutants emitted from automobiles.

In order to achieve the simultaneous conversion of carbon monoxide, hydrocarbon and nitrogen oxide pollutants, it has become the practice to employ catalysts (known as three component control catalysts) in conjunction with air-to-fuel ratio control means which function in response to a feedback signal from an oxygen sensor in the engine exhaust system. Although these three component control catalysts work quite well after they have reached operating temperature of about 300° C., at lower temperatures they are not able to convert substantial amounts of the pollutants. What this means is that when an engine and in particular an automobile engine is started up, (cold start) the three component control catalyst is not able to convert the hydrocarbons and other pollutants to innocuous compounds. Despite this limitation, current state of the art catalysts are able to meet the current emission standards. However, California has recently set new hydrocarbon standards (which most probably will be promulgated nationwide) which can not be met with the current state of the art three component control catalysts.

The prior art reveals several references which disclose the use of an adsorbent bed to minimize hydrocarbon emissions during a cold start engine operation. One such reference is U.S. Pat. No. 3,699,683 in which an adsorbent bed is placed after both a reducing catalyst and an oxidizing catalyst. The patentees disclose that when the exhaust gas stream is below 200° C. the gas stream is flowed through the reducing catalyst then through the oxidizing catalyst and finally through the adsorbent bed, thereby adsorbing hydrocarbons on the adsorbent bed. When the temperature goes above 200° C. the gas stream which is discharged from the oxidation catalyst is divided into a major and minor portion, the major portion being discharged directly into the atmosphere and the minor portion passing through the adsorbent bed whereby unburned hydrocarbons are desorbed and then flowing the resulting minor portion of this exhaust stream containing the desorbed unburned hydrocarbons into the engine where they are burned.

Another reference is U.S. Pat. No. 2,942,932 which teaches a process for oxidizing carbon monoxide and hydrocarbons which are contained in exhaust gas streams. The process disclosed in the patent consists of flowing an exhaust stream which is below 800° F. into an adsorption zone which adsorbs the carbon monoxide and hydrocarbons and then passing the resultant stream from this adsorption zone into an oxidation zone. When the temperature of the exhaust gas stream reaches about 800° F. the exhaust stream is no longer passed through the adsorption zone but is passed directly to the oxidation zone with the addition of excess air.

Canadian Patent No. 1,205,980 discloses a method of reducing exhaust emissions from an alcohol fueled automotive vehicle. This method consists of directing the cool engine start-up exhaust gas through a bed of zeolite particles and then over an oxidation catalyst and then the gas is discharged to the atmosphere. As the exhaust gas stream warms up it is continuously passed over the adsorption bed and then over the oxidation bed.

Finally, U.S. Pat. No. 4,985,210 discloses the purification of automotive exhaust by flowing the exhaust through an adsorbent bed and then through a catalyst. The adsorbent bed contains a mordenite or a Y-type zeolite.

Applicant has solved the cold start problem in a way that differs significantly from the prior art. Applicant's invention involves directing an engine exhaust gas stream during cold start operation over a catalyst; taking the gas stream discharged from the catalyst (first exhaust stream) and then flowing it over the turbine side of a turbocharger. After flowing through the turbine, the exhaust stream (second exhaust stream) is flowed over an adsorbent bed and then discharged to the atmosphere. The adsorbent bed preferentially adsorbs hydrocarbons instead of water at the conditions present in the exhaust stream. The adsorbents which may be used to adsorb the hydrocarbons may be selected from the group consisting of molecular sieves which have 1) a Si:Al ratio of at least 2.4; 2) are hydrothermally stable; and 3) have a hydrocarbon selectivity greater then 1. Examples of molecular sieves which meet these criteria are silicalite, faujasites, clinoptilolites, mordenites and chabazite. The adsorbent bed may be in any configuration with a preferred configuration being a honeycomb monolithic carrier having deposited thereon the desired molecular sieve. After a certain amount of time, the adsorbent bed has reached a temperature (about 150° C. to 200° C.) at which the bed is no longer able to remove hydrocarbons from the engine exhaust stream. That is, hydrocarbons are actually desorbed from the adsorbent bed instead of being adsorbed. At that point the second exhaust stream discharged from the turbine is divided into a major and minor component. The major component is discharged to the atmosphere, while the minor component is flowed through the adsorbent bed. The exhaust stream from the adsorbent bed (third stream) is now flowed through the compressor side of the turbocharger and then directed back over the catalyst. When all the hydrocarbons have been desorbed from the adsorbent bed, the second exhaust stream is completely diverted around the adsorbent bed and discharged to the atmosphere.

It is apparent that applicant's invention differs significantly from the prior art. One difference is that the adsorbent used in the instant process is one that must meet the three criteria stated above. Another difference is that the instant invention uses a turbocharger to recycle the exhaust stream from the adsorbent bed, which contains desorbed hydrocarbons, through the catalyst so that these hydrocarbons can be converted to innocuous compounds and not contribute to the emissions which are discharged to the atmosphere.

SUMMARY OF THE INVENTION

This invention generally relates to a process for treating an engine exhaust stream and in particular a process for minimizing pollutant emissions during the cold start operation of an engine. Accordingly, one embodiment of the invention is a process for treating an engine exhaust stream containing pollutants including hydrocarbons comprising directing the engine exhaust gas stream over a catalyst to give a first exhaust stream, flowing the first exhaust stream through the turbine side of a turbocharger to give a second exhaust stream which is then flowed through an adsorbent bed which comprises a molecular sieve bed which preferentially adsorbs the hydrocarbons versus water to provide a treated exhaust stream and discharging the treated exhaust stream into the atmosphere, said process being carried out for a time until the adsorbent bed temperature is about 150° C. to about 200° C. at which time the second exhaust stream is split into a major and minor portion, the major portion being diverted around the adsorbent bed and discharged into the atmosphere while the minor portion is flowed through the adsorbent bed for a time sufficient to desorb substantially all the hydrocarbons adsorbed on the molecular sieve bed to provide a third exhaust stream which is directed through the compressor side of the turbocharger and then directed back over the catalyst and after such time as necessary to desorb substantially all the hydrocarbons from the molecular sieve, directing the second exhaust stream completely around the adsorbent and discharging said stream to the atmosphere.

In a specific embodiment, the molecular sieve bed is a honeycomb monolithic carrier having deposited thereon a molecular sieve selected from the group consisting of molecular sieves having a Si:Al ratio of at least 2.4, is hydrothermally stable and has a hydrocarbon selectivity ($\alpha$HC—$H_2O$) greater than 1.

Other objects and embodiments will become more apparent after a more detailed description of the invention.

BRIEF DESCRIPTION OF THE DRAWING

The drawing is a schematic view of one embodiment of this invention showing an internal combustion engine and the process of this invention.

DETAILED DESCRIPTION OF THE INVENTION

As stated this invention generally relates to a process for treating an engine exhaust stream and in particular a process for minimizing emissions during the cold start operation of an engine. Referring now to the figure, engine 1 consists of any internal or external combustion engine which generates an exhaust gas stream containing noxious components including unburned or thermally degraded hydrocarbons or similar organics. Other noxious components usually present in the exhaust gas include nitrogen oxides and carbon monoxide. The engine may be fueled by a hydrocarbonaceous fuel. As used in this specification and in the appended claims, the term "hydrocarbonaceous fuel" includes hydrocarbons, alcohols and mixtures thereof. Examples of hydrocarbons which can be used to fuel the engine are the mixtures of hydrocarbons which make up gasoline or diesel fuel. The alcohols which may be used to fuel engines include ethanol and methanol. Mixtures of alcohols and mixtures of alcohols and hydrocarbons can also be used. Engine 1 may consist of a jet engine, gas turbine, internal combustion engine, such as an automobile, truck or bus engine, a diesel engine or the like. The process of this invention is particularly suited for treating an exhaust stream from a gasoline fueled automobile engine. Under the conditions of the figure, engine 1 is initially operating at a relatively reduced temperature, such as a cold engine at start-up or warm-up which produces a relatively high concentration of hydrocarbon vapors (when a hydrocarbon fuel is used) in the engine exhaust gas stream. When an alcohol is the fuel, the exhaust stream will contain unburned alcohol.

For convenience the description will use hydrocarbon as the fuel to exemplify the invention. The use of hydrocarbon in the subsequent description is not to be construed as limiting the invention to hydrocarbon fueled engines.

The engine exhaust gas stream under start-up conditions is generally at a temperature below 500° C. and typically in the range of 200° to 400° C., and contains pollutants including high concentration of hydrocarbons as well as nitrogen oxides and carbon monoxide. Pollutants will be used herein to collectively refer to any unburned fuel components and combustion byproducts found in the exhaust stream. For example, when the fuel is a hydrocarbon fuel, hydrocarbons, nitrogen oxides, carbon monoxide and other combustion byproducts will be found in the exhaust gas stream. The engine exhaust stream is produced at this relatively low temperature during the initial period of engine operation, typically for the first 30 seconds to 120 seconds after start-up of a cold engine. The engine exhaust stream will typically contain, by volume, 500 to 1000 ppm hydrocarbons.

The engine exhaust stream is flowed through exhaust pipe 2 and then through catalyst 3. The function of the catalyst is to convert the pollutants in the engine exhaust stream to innocuous components. When the engine is fueled by a hydrocarbon, the catalyst is referred to in the art as a three component control catalyst because it can simultaneously oxidize any residual hydrocarbons present in the engine exhaust stream to carbon dioxide and water, oxidize any residual carbon monoxide to carbon dioxide and reduce any nitric oxide to nitrogen and oxygen. In some cases the catalyst may not be required to convert nitric oxide to nitrogen and oxygen, e.g., when an alcohol is used as the fuel. In this case the catalyst is called an oxidation catalyst, Because of the relatively low temperature of the engine exhaust stream, this catalyst does not function at a very high efficiency, thereby necessitating the adsorbent bed 9.

This partially treated exhaust stream (hereinafter first exhaust stream) discharged from catalyst 3 is now flowed through exhaust pipe 4 and through turbine 5. Turbine 5 is connected by a common shaft to compressor 15 and together they make up what is commonly known in the art as a turbocharger. A second exhaust gas stream is discharged from the turbine, flowed through exhaust pipe 6, through control value 7, through exhaust pipe 8 and through adsorbent bed 9. Adsorbent bed 9 contains one or more beds of a suitable adsorbent for hydrocarbons. The adsorbents which can be used for the practice of this invention are molecular sieves as characterized herein. Hereinafter, the adsorbent bed will be referred to as a molecular sieve bed. The hydrocarbons and other noxious components are selectively adsorbed, i.e., preferentially over water, in the molecular sieve bed.

The treated exhaust which is discharged from the adsorbent bed is flowed through exhaust pipe 11, then through control valve 12 and finally discharged through exhaust pipe 11 to the atmosphere. It is understood that prior to discharge into the atmosphere the treated exhaust stream may be flowed through a muffler or other sound reduction apparatus well known in the art.

The temperature at the exit of the adsorbent bed 9 is measured by temperature sensing element 10 which typically consists of a thermocouple or other temperature sensing device which transmits an electrical signal to a microprocessor located on the engine. At a preset adsorbent bed temperature usually in the range of 150° C. to about 200° C., the microprocessor sends a message to control valve 7 to partially open valve 7 such that a major portion of the second exhaust stream is flowed through exhaust pipe 13 and then discharged to the atmosphere via exhaust pipe 11. It should be pointed out that when the adsorbent bed has reached a temperature of about 150° to about 200° C., the catalyst has reached a temperature of about 300° to about 500° C. At these temperatures, the catalyst is within its operating temperature such that it is converting over 90% of the pollutants in the engine exhaust stream to innocuous compounds. Therefore, the major portion of the second exhaust stream is sufficiently treated so that it can be discharged to the atmosphere.

A minor portion of the second exhaust stream is flowed through adsorbent bed 9 via exhaust pipe 8. The minor portion of the now hot second exhaust gas stream which flows through adsorbent bed 9 desorbs the hydrocarbons and any other pollutants adsorbed on the adsorbent bed to provide a third exhaust stream. At the time when valve 7 is partially opened, the microprocessor also sends a signal to control valve 12 to close control valve 12 such that the third exhaust stream flows through exhaust pipe 11 and then through exhaust pipe 14 and then through compressor 15. The third exhaust stream which is discharged from the compressor is now flowed through exhaust pipe 16 and into exhaust pipe 2 at a point upstream of catalyst 3.

After a period of time in which substantially all the pollutants are desorbed from the adsorbent bed, (by substantially is meant at least 95% of the pollutants), generally about 3 to about 5 minutes, the microprocessor sends a signal to control valve 7 to divert all the second exhaust stream around the adsorbent bed via exhaust pipe 13 and then discharging the second exhaust stream to the atmosphere via exhaust pipe 11. At the same time the microprocessor closes control valve 12.

The adsorbent which is used in adsorbent bed 9 is a molecular sieve which has a high selectivity for hydrocarbon versus water. In particular, the molecular sieves which can be used in this invention have the following characteristics: 1) a framework Si:Al ratio of at least 2.4; 2) hydrothermally stable; and 3) a hydrocarbon selectivity ($\alpha$HC—H$_2$O) greater than 1.0. By hydrothermally stable is meant the ability of the molecular sieve to maintain its structure after thermal cycling in the exhaust gas stream. One method of measuring hydrothermal stability is to look at the temperature at which 50% of the structure is decomposed after heating for 16 hours in air. The temperature is referred to as T(50). Accordingly, as used in this application, by hydrothermally stable is meant a molecular sieve which has a T(50) of at least 750° C. The hydrocarbon selectivity $\alpha$ is defined by the following equation:

$$\alpha HC-H_2O = \frac{X_{HC}}{X_{H2O}} \cdot \frac{[H_2O]}{[HC]}$$

$X_{HC}$ = the hydrocarbon co-loading on the molecular sieve in equilibrium with the hydrocarbon water vapor mixture in the gas phase over the zeolite adsorbent;

$X_{H2O}$ = the water co-loading on the molecular sieve in equilibrium with the water and hydrocarbon vapor mixture in the gas phase over the molecular sieve adsorbent;

[H$_2$O] = the concentration of water vapor in the exhaust gas stream; and

[HC] = the concentration of the hydrocarbon species in the exhaust gas.

The above definitions show that the selectivity of molecular sieves for hydrocarbons over water is dependent upon the exhaust gas stream temperature, the particular hydrocarbon species of interest and the relative concentrations of water vapor and hydrocarbon.

In order to calculate $X_{HC}$ and $X_{H2O}$ one needs to first determine the intrinsic adsorption strength of the molecular sieve. Intrinsic adsorption strength can be described by reference to the Dubinin Polanyi model for adsorption. The model says that the sorption expressed as the volume of the adsorbent structure occupied by the sorbate is a unique function of the Gibbs Free Energy change on adsorption. Mathematically this relationship takes the form of a Gaussian distribution with Gibbs free energy change as follows:

$$X = \text{Liq. dens} \cdot VO \exp(-B \cdot G \cdot G)$$

where X is the loading expected, VO is the pore volume (cc/g), B is a constant that is dependent on the adsorbent and sorbate, and G is the Gibbs Free Energy change. The product of liquid density and VO equates to the saturation loading, XO, for any pure compound by the Gurvitsch Rule. (see Breck, Zeolite Molecular Sieves, page 426.)

For ideal gases $G = RT \ln (P^o/P)$.

The constant B is then inversely related to the intrinsic adsorption strength. For example, if the hydrocarbon is benzene, a value of B of 0.04 for both benzene and water gives good results. The estimates of water and hydrocarbon co-loadings are made in the following way:

1) each individual component loading is estimated by use of the Dubinin Polanyi model as outlined above. For each compound present one needs to know the liquid phase density (approximating the sorbed phase density), the vapor pressure as a function of temperature, and the actual concentration of the species in the gas.

2) Once each pure component loading is calculated, the function is calculated as, $$\Phi = X/XO/(1 - X/XO)$$

where X/XO is the loading ratio or fraction of the pore volume filled by each component if it were present alone. $\Phi$ then represents the ratio of occupied pore volume to unoccupied pore volume.

3) The co-loadings are then calculated, accounting for each species present, by the formula, $$X_{mc} = XO^*\Phi/(1 + \Sigma\Phi)$$

$X_{mc}$ is the co-loading of each component on the zeolite. This procedure follows the Loading Ratio Correlation, which is described in "Multicomponent Adsorption Equilibria on Molecular Sieves", C. M. Yon and P. H. Turnock AICHE Symposium Series, No. 117, Vol. 67 (1971).

Both natural and synthetic molecular sieves may be used as adsorbents. Examples of natural molecular sieves which can be used are faujasites, clinoptilolites, mordenites, and chabazite. Examples of synthetic molecular sieves which can be used are silicalite, Zeolite Y, ultrastable zeolite Y, ZSM-5. Of course mixtures of these molecular sieves both natural and synthetic can be used.

The adsorbent bed used in the instant invention can be conveniently employed in particulate form or the adsorbent, i.e., molecular sieve, can be deposited onto a solid monolithic carrier. When particulate form is desired, the adsorbent can be formed into shapes such as pills, pellets, granules, rings, spheres, etc. In the employment of a monolithic form, it is usually most convenient to employ the adsorbent as a thin film or coating deposited on an inert carrier material which provides the structural support for the adsorbent. The inert carrier material can be any refractory material such as ceramic or metallic materials. It is desirable that the carrier material be unreactive with the adsorbent and not be degraded by the gas to which it is exposed. Examples of suitable ceramic materials include sillimanite, petalite, cordierite, mullite, zircon, zircon mullite, spodumene, alumina-titanate, etc. Additionally, metallic materials which are within the scope of this invention include metals and alloys as disclosed in U.S. Pat. No. 3,920,583 which are oxidation resistant and are otherwise capable of withstanding high temperatures.

The carrier material can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. Nos. 3,785,998 and 3,767,453.

The molecular sieve is deposited onto the carrier by any convenient way well known in the art. A preferred method involves preparing a slurry using the molecular sieves and coating the monolithic honeycomb carrier with the slurry. The slurry can be prepared by means known in the art such as combining the appropriate amount of the molecular sieve and a binder with water. This mixture is then blended by using means such as sonification, milling, etc. This slurry is used to coat a monolithic honeycomb by dipping the honeycomb into the slurry, removing the excess slurry by draining or blowing out the channels, and heating to about 100° C. If the desired loading of molecular sieve is not achieved, the above process may be repeated as many times as required to achieve the desired loading.

The size of the adsorbent bed is chosen such that at least 40% of the hydrocarbons in the exhaust stream discharged from the engine is adsorbed. Generally, this means that the size of the adsorbent bed varies from about 1 to about 3 liters. When the adsorbent is deposited on a monolithic honeycomb carrier, the amount of adsorbent on the carrier varies from about 100 to about 450 grams. It is desirable to optimize the volume of the adsorbent bed such that the primary catalyst downstream from the adsorbent bed is heated as quickly as possible while at the same time ensuring that at least 40% of the hydrocarbons in the exhaust stream are adsorbed on the adsorbent bed. It is preferred that the adsorbent be deposited on a monolithic honeycomb carrier in order to minimize the size of the adsorbent bed and the back pressure exerted on the engine.

Instead of depositing the molecular sieve onto a monolithic honeycomb structure, one can take the molecular sieve and form it into a monolithic honeycomb structure.

The adsorbent which is a molecular sieve may optionally contain one or more catalytic metals dispersed thereon. The metals which can be dispersed on the adsorbent are the noble metals which consist of platinum, palladium, rhodium, ruthenium, and mixtures thereof. The desired noble metal may be deposited onto the adsorbent, which acts as a support, in any suitable manner well known in the art. One example of a method of dispersing the noble metal onto the adsorbent support involves impregnating the adsorbent support with an aqueous solution of a decomposable compound of the desired noble metal or metals, drying the adsorbent which has the noble metal compound dispersed on it and then calcining in air at a temperature of about 400° to about 500° C. for a time of about 1 to about 4 hours. By decomposable compound is meant a compound which upon heating in air gives the metal or metal oxide. Examples of the decomposable compounds which can be used are set forth in U.S. Pat. No. 4,791,091 which is incorporated by reference. Preferred decomposable compounds are chloroplatinic acid, rhodium trichloride, chloropalladic acid, hexachloroiridate (IV) acid and hexachlororuthenate. It is preferable that the noble metal be present in an amount ranging from about 0.01 to about 4 weight percent of the adsorbent support. Specifically, in the case of platinum and palladium the range is 0.1 to 4 weight percent, while in the case of rhodium and ruthenium the range is from about 0.01 to 2 weight percent.

These catalytic metals are capable of oxidizing the hydrocarbon and carbon monoxide and reducing the nitric oxide components to innocuous products. Accordingly, the adsorbent bed can act both as an adsorbent and as a catalyst.

The catalyst which is used in this invention is selected from any three component control or oxidation catalyst well known in the art. Examples of catalysts are those described in U.S. Pat. Nos. 4,528,279; 4,791,091; 4,760,044; 4,868,148; and 4,868,149, which are all incorporated by reference. Preferred catalysts well known in the art are those that contain platinum and rhodium and optionally palladium, while oxidation catalysts usually do not contain rhodium. Oxidation catalysts usually contain platinum and/or palladium metal. These catalysts may also contain promoters and stabilizers such as barium, cerium, lanthanum, nickel, and iron. The noble metals and promoters and stabilizers are usually deposited on a support such as alumina, silica, titania, zirconia, alumino silicates, and mixtures thereof with alumina being preferred. The catalyst can be conveniently employed in particulate form or the catalytic composite can be deposited on a solid monolithic carrier with a monolithic carrier being preferred. The particulate form and monolithic form of the catalyst are as described for the adsorbent above.

By employing a turbocharger, the adsorbent bed 9 is able to adsorb pollutants for a longer period of time then if a turbocharger were not used. The reason for this is that the second exhaust stream which is discharged from the turbine has a lower temperature then the first exhaust stream that entered the turbine. Consequently, it will take a longer amount of time for the adsorbent bed to reach a temperature of about 150° to about 200° C. and therefore, a greater amount of pollutants, especially hydrocarbons, will be adsorbed on the adsorbent bed, i.e., molecular sieve bed.

I claim as my invention:

1. A process for treating an engine exhaust steam containing pollutants including hydrocarbons comprising directing the engine exhaust gas stream over a catalyst to give a first exhaust stream, flowing the first exhaust stream through the turbine side of a turbocharger to give a second exhaust stream which is then flowed through an adsorbent bed which comprises a molecular sieve bed which preferentially adsorbs the hydrocarbons versus water to provide a treated exhaust stream and discharging the treated exhaust stream into the atmosphere, said process being carried out for a time until the adsorbent bed temperature is about 150° C. to about 200° C. at which time the second exhaust stream is split into a major and minor portion, the major portion being diverted around the adsorbent bed and discharged into the atmosphere while the minor portion is flowed through the adsorbent bed for a time sufficient to desorb substantially all the hydrocarbons adsorbed on the molecular sieve bed to provide a third exhaust stream which is directed through the compressor side of the turbocharger and then directed back over the catalyst and after such time as necessary to desorb substantially all the hydrocarbons from the molecular sieve, directing the second exhaust stream completely around the adsorbent bed and discharging said stream to the atmosphere.

2. The process of claim 1 where the molecular sieve bed is characterized in that it comprises at least one molecular sieve selected from the group consisting of molecular sieves which: 1) have a framework Si:Al ratio of at least 2.4; 2) are hydrothermally stable; and 3) have a hydrocarbon selectivity ($\alpha HC-H_2O$) greater than 1 where $\alpha HC-H_2O$ is defined by the following equation, $$\alpha HC-H_2O = \frac{X_{HC}}{X_{H_2O}} \cdot \frac{[H_2O]}{[HC]}$$

where $X_{HC}$ is the hydrocarbon co-loading on the molecular sieves in equilibrium with the hydrocarbon water vapor mixture in the gas phase over the molecular sieve adsorbent, $X_{H_2O}$ is the water co-loading on the zeolite in equilibrium with the water and hydrocarbon vapor mixture in the gas phase over the molecular sieve adsorbent, $[H_2O]$ is the concentration of water and $[HC]$ is the concentration of hydrocarbon.

3. The process of claim 2 where the molecular sieve is selected from the group consisting of silicalite, faujasite, clinoptilotites, mordenites chabazite, zeolite ultrastable Y, zeolite Y, ZSM-5 and mixtures thereof.

4. The process of claim 3 where the molecular sieve is faujasite.

5. The process of claim 3 where the molecular sieve is zeolite ultrastable Y.

6. The process of claim 2 where the molecular sieve bed is a honeycomb monolithic carrier having deposited thereon a molecular sieve.

7. The process of claim 1 where the engine is an internal combustion engine.

8. The process of claim 7 where the internal combustion engine is an automobile engine.

9. The process of claim 1 where the engine is fueled by a hydrocarbonaceous fuel.

10. The process of claim 9 where the fuel is an alcohol.

11. The process of claim 9 where the fuel is a hydrocarbon.

12. The process of claim 1 where the molecular sieve bed has deposited thereon a metal selected from the group consisting of platinum, palladium, rhodium, ruthenium and mixtures thereof.

13. The process of claim 12 where the metal is platinum.

14. The process of claim 12 where the metal is palladium.

15. The process of claim 12 where the metal is a mixture of platinum and palladium.

* * * * *